United States Patent [19]
Jablonski et al.

[11] 3,928,410
[45] Dec. 23, 1975

[54] PROCESS FOR THE PRODUCTION OF HYDROZONITRILES

[75] Inventors: John Michael Jablonski, Over; John Miller, Mapperley, both of England

[73] Assignee: Fisons Ltd., England

[22] Filed: Sept. 23, 1974

[21] Appl. No.: 508,271

[30] Foreign Application Priority Data
Oct. 2, 1973  United Kingdom............... 45904/73

[52] U.S. Cl....... 260/465.5 R; 260/464; 260/465 E; 260/465.4
[51] Int. Cl.²........................................ C07C 120/02
[58] Field of Search......... 260/465.5 R, 464, 465 E, 260/465.4

[56] References Cited
UNITED STATES PATENTS

| | | | |
|---|---|---|---|
| 2,469,358 | 5/1949 | Alderson, Jr. et al. | 260/465.5 R |
| 3,192,196 | 6/1965 | Vidal et al. | 260/465.5 R X |
| 3,775,395 | 11/1973 | Koyanagi et al. | 260/465.5 R X |

*Primary Examiner*—Joseph P. Brust
*Attorney, Agent, or Firm*—Wenderoth, Lind & Ponack

[57] ABSTRACT

Hydrazonitriles are produced by reacting a metal cyanide with an azine or with hydrazine and a ketone or aldehyde, in the presence of a stoichiometric excess of formic, acetic or propionic acid.

8 Claims, No Drawings

PROCESS FOR THE PRODUCTION OF HYDROZONITRILES

The present invention relates to a process for the production of hydrazonitriles.

Hydrazonitriles are important intermediates for the production of azonitriles which are useful as polymerisation initiators and as chemical blowing agents for thermoplastic materials.

It has been proposed to manufacture hydrazonitriles by the reaction of a ketone, hydrazine and hydrogen cyanide in an aqueous medium, but the reaction is slow and satisfactory yields may require reaction times of over a hundred hours. A modification of this process using azines and hydrogen cyanide has also been found difficult to operate. Both processes of course suffer disadvantages in the use of the highly poisonous hydrogen cyanide.

The invention provides a process which alleviates many of the problems associated with these processes.

Accordingly, the present invention provides a process for the production of hydrazonitriles comprising the reaction of a metal cyanide with an azine or with hydrazine and a ketone or aldehyde, in the presence of a stoichiometric excess of concentrated formic, acetic or propionic acid or a mixture thereof.

The process avoids the difficulties of handling liquid or gaseous hydrogen cyanide, and in addition, is capable of giving high yields, for example of over 80%, in under 24 hours. The process is particularly valuable for use with aldehydes, ketones or azines which because of steric or solubility effects give little or no yield of hydrazonitriles in the presence of water. Furthermore, the reaction product is suitable for the production of the azonitrile by oxidation of the hydrazonitrile without separation.

Preferred hydrazonitriles have the general formula:

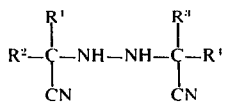

wherein $R^1$, $R^2$, $R^3$ and $R^4$, which may be the same or different, are selected from hydrogen, alkyl (preferably alkyl of 1 to 8 carbon atoms, for example, methyl, ethyl, n-propyl, iso-propyl, n-butyl, iso-butyl, t-butyl, amyl, neo-pentyl, n-hexyl, n-heptyl, n-octyl), cycloalkyl (preferably cycloalkyl of 5 to 8 carbon atoms, for example cyclopentyl, cyclohexyl), aryl (for example, phenyl), alkaryl (preferably phenyl substituted by up to two alkyl groups of 1 to 4 carbon atoms, for example methylphenyl, ethylphenyl), aralkyl (preferably phenylalkyl in which the alkyl group is of 1 to 4 carbon atoms, for example, benzyl, phenethyl), alkoxyalkyl (preferably alkoxyalkyl of 2 to 8 carbon atoms, for example methoxymethyl, methoxyethyl), alkoxyphenyl (preferably having an alkoxy group of 1 to 4 carbon atoms, for example methoxyphenyl) and carboxyalkyl (preferably having an alkyl group of 1 to 4 carbon atoms, for example carboxymethyl, carboxyethyl); or $R^1$ and $R^2$ together or $R^3$ and $R^4$ together complete a cycloalkyl group which may be straight chain, branched chain or bridged (preferably cycloalkyl having 5 to 12 carbon atoms, for example, cyclohexyl, bornyl, 4-methylcyclohexyl), provided that $R^1$ and $R^2$ or $R^3$ and $R^4$ are not both hydrogen.

Preferred hydrazonitriles are those in which $R^1$, $R^2$, $R^3$ and $R^4$ are all the same, and those in which $R^1$ and $R^3$ are the same and $R^2$ and $R^4$ are the same. Particularly preferred hydrazonitriles are those in which $R^{1-4}$ are alkyl of 1 to 8 carbon atoms, particularly methyl, ethyl, propyl, n-butyl and iso-butyl.

Preferred metal cyanides are alkali metal cyanides, particularly potassium and sodium cyanides.

The aldehyde, ketone and azine will of course depend on the intended product, but preferred aldehydes and ketones are methyl n-butyl ketone, methyl t-butyl ketone, methyl iso-butyl ketone, di-n-butyl ketone, di-iso-butyl ketone, di-isopropyl ketone, methyl cyclohexyl ketone, methylamyl ketone, cyclohexanone, camphor, acetophenone, methyl n-hexyl ketone, butyraldehyde, heptaldehyde, benzaldehyde, 4-methoxy-4-methyl pentanone-2, methyl neo-pentyl ketone, methylphenyl isobutyl ketone and levulinic acid. Particularly preferred ketones are methyl iso-butyl ketone and cyclohexanone. Particularly preferred azines are those of the above mentioned aldehydes and ketones.

The symmetrical hydrazonitriles may be prepared using a single ketone or a symmetrical azine. The assymetrical hydrazonitriles may be prepared using the appropriate asymmetrical azine, which may be found in situ by the reaction of a hydrazone of one aldehyde or ketone with another aldehyde or ketone.

The molar ratio of metal cyanide to azine is preferably greater than 2:1 and is suitably from 2.4 to 6:1. The molar ratio of metal cyanide to aldehyde or ketone is preferably greater than 1:1 and is suitably from 1.2 to 3:1.

The acid is provided in stoichiometric excess. In general, the molar ratio of acid to metal cyanide is suitably in the range 1.5 to 10:1, and is preferably 2.5 to 5:1. The preferred acid is glacial acetic acid.

The reaction mixture may contain up to about 8% water, which may be added or which may originate for example, in the concentrated acid or hydrazine hydrate or as water of reaction.

The reaction mixture may be cooled during the reaction. Preferably the temperature is maintained below 50°C, and most preferably in the range 15° to 35°C.

The reaction mixture is preferably stirred only for up to the first six hours of the reaction. After this period, the reaction mixture becomes highly viscous and stirring becomes difficult, but in any event, we have surprisingly found that stirring the viscous reaction mixture may actually reduce the yield.

The reaction product produced by a process according to the invention may be oxidised in an aqueous medium to the corresponding azonitrile without further treatment.

Accordingly, in a further embodiment, the present invention provides a process for the production of an azonitrile comprising oxidising a reaction mixture produced by a process as described above.

Preferably the oxidising agent is chlorine, which may be passed through an aqueous suspension of the reaction mixture. Alternatively a bleach solution, such as hypochlorite, may be used.

The reaction mixture may be cooled during the oxidation, a temperature in the range 0° to 40°C generally being suitable. Where chlorine is being used, a temperature of 0° to 15°C is preferred.

The following examples are given to illustrate the invention.

EXAMPLE 1

180 mls glacial acetic acid were added to a stirred mixture of 60g NaCN and 50g methyl iso-butyl ketazine keeping the temperature at 30°C by cooling. With the cooling removed, the reaction temperature stayed at 30°–32°C and stirring was continued until it fell below 27°C (after about 20 hours). During this time the reaction mixture changed gradually to a viscous white mass containing 2.4' - hydrazobis (2.4-dimethylvaleronitrile) free from unreacted methyl isobutyl ketazine.

100 mls water were added and chlorine gas bubbled in keeping the temperature at 10° by cooling. After about 2 hours escape of chlorine indicated completion of the oxidation. The white 2.2' azobis-(2.4-dimethylvaleronitrile) was recovered by filtration, washed with cold water and air dried at room temperature. The yield of dried product was 53g (84% of theoretical based on ketazine); it melted at 46°–62°.

EXAMPLE 2

To a stirred mixture of methylisobutylketone (50g 0.5 mole) hydrazine hydrate (12.5g 0.25 mole) and sodium cyanide (45g 0.918 mole) is added 165g glacial acetic acid, and the temperature kept at 30°C by cooling. After the addition the temperature is kept at 30°C for 40 hours, during which time the mobile reaction mixture changes to a pasty mass. This was oxidised as in Example 1 to give 45.7g (73% of theoretical) of dried 2.2' - azobis - (2.4 dimethyl valeronitrile).

EXAMPLE 3

Glacial acetic acid (100 mls) was added to a stirred mixture of sodium cyanide (30g, 0.6 mole) and methyl isobutylketazine (60 mls, 0.25 mole) keeping the temperature at 30°C by cooling. The stirring was stopped after 6 hours but heating of the resulting viscous white mass was continued for a further 18 hours. 150 mls water were then added and the suspension oxidised as in Example 1 to give 50g (79% of theoretical) 2,2'-azobid(2,4-dimethyl voleronitrile).

EXAMPLE 4

To a stirred mixture of 4-methoxy-4-methyl pentanone-2 (65g, 0.5 mole), hydrazine hydrate (12.5g, 0.25 mole) and sodium cyanide (45g, 0.918 mole) was added 165g glacial acetic acid, keeping the temperature at 30°C by cooling. Stirring was continued at 30°C for 40 hours during which time the reaction mixture changed to a pasty mass. This was oxidised as in Example 1 to give 2.2'-azobis(2,4-dimethyl-4-methoxy valeronitrile) 59g, (75% yield on ketone).

EXAMPLE 5

Sodium cyanide (24g) was added to a stirred mixture of hydrazine hydrate (12.5g) and glacial acetic acid (100 mls), keeping the temperature below 30°C by cooling. A solution of cyclohexanone (49g) in glacial acetic acid (85 mls) was added dropwise in 45 minutes, keeping the temperature at 30°C. After stirring at this temperature for a further 1.25 hours the white 1,1'hydrazobis-(1-cyclohexanenitrile) which formed was filtered off and washed with cold water. The 140g of damp product was oxidised in aqueous suspension at 35°C with 200 mls 15% sodium hypochlorite solution and sodium bromide catalyst. After filtering, water washing and drying, 52g (85% theoretical yield) of 1,1'-azobis-(cyclohexanenitrile), mp 110°–112°C was obtained.

We claim:

1. A process for the production of a hydrazonitrile having the formula:

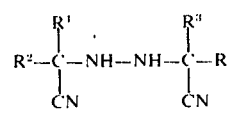

wherein $R^1$, $R^2$, $R^3$ and $R^4$, which may be different, are selected from the group consisting of hydrogen, alkyl of 1 to 8 carbon atoms, cycloalkyl of 5 to 8 carbon atoms, phenyl which may be substituted by up to two alkyl groups of 1 to 4 carbon atoms, phenylalkyl in which the alkyl group is of 1 to 4 carbon atoms, alkoxyalkyl of 2 to 8 carbon atoms, alkoxyphenyl in which the alkoxy group is of 1 to 4 carbon atoms, carboxyalkyl in which the alkyl group is of 1 to 4 carbon atoms, and $R^1$ and $R^2$ together or $R^3$ and $R^4$ together completing a cycloalkyl group of 5 to 12 carbon atoms; provided that $R^1$, $R^2$, or $R^3$ and $R^4$, are not both hydrogen;

which process comprises reacting 1 molar proportion of an azine reactant selected from the group consisting of
 a. the corresponding azine, and
 b. hydrazine and the corresponding alkehyde or ketone, with at least 2 molar proportions of sodium or potassium cyanide, in the presence of a stoichiometric excess of concentrated acid selected from the group consisting of formic, acetic and propionic acids and mixtures thereof.

2. A process according to claim 1 wherein water is present in the reaction mixture at up to about 8%.

3. A process according to claim 1 wherein $R^{1-4}$ are selected from methyl, ethyl, propyl, n-butyl and isobutyl groups.

4. A process according to claim 1 wherein the molar ratio of metal cyanide to azine is 2.4 to 6:1 or the molar ratio of metal cyanide to aldehyde or ketone is 1.2 to 3:1.

5. A process according to claim 1 wherein the molar ratio of acid to metal cyanide is 1.5 to 10:1.

6. A process according to claim 1 wherein the temperature of the reaction mixture is maintained below 50°C.

7. A process according to claim 6 wherein the temperature of the reaction mixture is maintained in the range 15° to 35°C.

8. A process according to claim 1 wherein the reaction mixture is stirred only for up to the first six hours of the reaction.

* * * * *